(12) United States Patent
Moriyama

(10) Patent No.: US 6,741,696 B1
(45) Date of Patent: May 25, 2004

(54) AUTOMATIC CALL DISTRIBUTING METHOD AND SYSTEM

(75) Inventor: Kazumi Moriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 518 days.

(21) Appl. No.: 09/709,633

(22) Filed: Nov. 13, 2000

(30) Foreign Application Priority Data

Nov. 12, 1999 (JP) ............................................. 11-322430

(51) Int. Cl.$^7$ ................................................ H04Q 3/64
(52) U.S. Cl. ........................... 379/265.01; 379/221.03; 379/221.04
(58) Field of Search ................ 379/265.01–265.14, 379/266.01–266.1, 309, 221.04, 221.03, 219, 220.01, 221.01

(56) References Cited

U.S. PATENT DOCUMENTS

| | | | |
|---|---|---|---|
| 4,488,004 A | * 12/1984 | Bogart et al. .................. | 179/18 |
| 5,450,482 A | 9/1995 | Chen et al. | |
| 5,592,542 A | 1/1997 | Honda et al. | |
| 5,903,571 A | * 5/1999 | Koepper et al. ............. | 370/524 |
| 5,907,611 A | * 5/1999 | Dezonno et al. ............. | 379/266 |
| 6,366,668 B1 | * 4/2002 | Borst et al. ............. | 379/266.04 |
| 6,463,148 B1 | * 10/2002 | Brady .................... | 379/265.01 |
| 6,577,605 B1 | * 6/2003 | Dagate et al. | |

2002/0057782 A1   5/2002   Haruta

FOREIGN PATENT DOCUMENTS

| | | |
|---|---|---|
| JP | 5-68105 | 3/1993 |
| JP | 6-232982 | 8/1994 |
| JP | 6-237293 | 8/1994 |
| JP | 06-282830 | 10/1994 |
| JP | 08-092025 | 4/1996 |
| JP | 08-102280 | 4/1996 |
| JP | 11-122358 | 4/1999 |
| JP | 2000-314430 | 11/2000 |

* cited by examiner

Primary Examiner—William J. Deane, Jr.
(74) Attorney, Agent, or Firm—Foley & Lardner

(57) ABSTRACT

A PBX (3-*a*) detected an incoming call arrived at a line trunk (2-*a*) via a public line network (1), and at the same time, an ACDP (4-*a*) queues an incoming call arrived in an incoming sequence queue (8-*a*). In addition, the ACDP (4-*a*) scans a distribution sequence queue (9-*a*), and controls an incoming call to be distributed to an extension line that seems to be the most preferable in the extension line group (6-*a*). On the other hand, an incoming call arrived at the line trunk (2-*b*) via the public line network (1) is detected by the PBX (3-*b*) via a leased communication line (7). At the same time, the ACDP (4-*b*) queues an incoming call in the incoming sequence queue of the extension line group (6-*b*). In addition, the ACDP (4-*b*) scans a distribution queue (9-*b*), and controls the queued incoming call to be distributed to an optimal extension line belong to the extension line group (6-*b*).

11 Claims, 4 Drawing Sheets

AUTOMATIC CALL DISTRIBUTING METHOD AND SYSTEM

BACKGROUND OF THE INVENTION

The present invention relates to a private branch exchange (hereinafter, referred to as PBX) that mounts an automatic call distribution processor (hereinafter, referred to as ACDP).

Conventionally, in order to efficiently process an incoming call (request or ordering) by distributing an incoming call such as request for tickets from a number of customers or mail order or the like to a vacant extension line in an extension line group that consists of a plurality of reception terminals (extension lines), there is adopted an automatic call distributing system in which an ACDP is mounted in an PBX.

FIG. 1 is a block diagram depicting an example of a conventional automatic call distributing system. A PBX (3) mounts an ACDP (4), and performs exchange control by referring to data written in a data base (5). Th PBX (3) houses trunk circuits (2-a) and (2-b) for controlling a call from a general public line network (1). Incoming calls arrived at the trunk circuits (2-a) and (2-b) are distributed by controlling with an ACDP (4), respectively, to an extension line group (6-a) or an extension line group (6-b). Which of these extension line groups targeted for distribution is determined by referring to the content of the data base 5. In addition, the PBX (3) comprises an incoming call sequence queue (8) and a distribution sequence queue (9).

In FIG. 1, for example, in the case where settings are provided so that the data written in the data base (5) assign the trunk circuit (2-a) to the extension line group (6-a), and to assign the trunk circuit (2-b) to the extension line group (6-b), the PBX (3) detects an incoming call arrived at the line trunk (2-a) via a public line network (1), and at the same time, the ACDP (4) queues an incoming call to the incoming call sequence queue (8-a) Further, the ACDP (4) scans a distribution sequence queue (9-a), and controls the incoming call to be distributed to an extension line that seems to be the most preferable in the extension line group (6-a).

In addition, the PBX (3) detects an incoming call arrived at the line trunk (2-b) via the public line network (1), and at the same time, the ACDP (4) queues the incoming call in an incoming sequence queue (8-b) of the extension line group (6-b). Further, the ACDP (4) scans a distribution queue (9-b), and controls the queued incoming call to be distributed to the optimal line belong to the extension line group (6-b).

FIG. 2 is a block diagram depicting another example of a conventional automatic call distributing system. In this conventional example, two PBXs (3-a) and (3-b) are connected to each other via a leased communication line (7), and networked (via LAN or the like). An ACDP (4-a) is mounted in the PBX (3-a), and exchange control is performed based on data written in the data base (5-a).

In FIG. 2, the PBX (3-a) houses the trunk circuits (2-a) and (2-b) that control a call from the general public line network (1) . The ACDP (4-a) distributes an incoming call arrived at the trunk circuit (2-a) to the extension line group (6-a) by referring to the contents of the data base (5-a), and distributes an incoming come arrived at the trunk circuit (2-b), respectively, to the extension line group (6-b) connected to the PBX (3-b) via the leased communication line 7.

Each PBX comprises incoming sequence queues (8-a) and (8-b) and distribution sequence queues (9-a) and (9-b).

The PBX (3-a) detects an incoming call arrived at the line trunk (2-a) via the public line network (1), and at the same time, the ACDP (4-a) queues an incoming call in the incoming sequence queue (8-a). Further, the ACDP (4-a) scans a distribution sequence queue (9-a), and controls an incoming call to be distributed to an extension line that seems to be the most preferable in the extension line group (6-a).

On the other hand, an incoming call arrived at the line trunk (2-b) via the public line network (1) is transferred to the PBX (3-b) via the leased communication line (7), and the ACDP (4-a) queues the incoming call in the incoming sequence queue of the extension line group (6-b). Further, the ACDP (4-a) scans the distribution sequence queue (9-b), and controls the queued incoming call to be distributed to the optimal extension line that belongs to the extension line group (6-b).

In the case of a system in which an ACDP (4) is mounted in one PBX (3), as shown in FIG. 1, thereby controlling distribution to a plurality of trunk circuits (2-a) and (2-b) connected to the PBX and a plurality of extension line groups (6-a) and 6-b), its scale is difficult to extend. In addition, in the case where a large scaled PBX is provided, a load upon the ACDP (4) increases, thus making it difficult to construct an efficient automatic call distributing system.

In addition, as shown in FIG. 2, in the case of a system in which its scale is extended by connecting a plurality of PBXs via a leased line, all distribution controls are, performed by a single ACDP. Thus, a load upon this ACDP increases, and similarly, there is a problem in that an inefficient system capacity results.

In addition, in the case where a failure or the like occurs, operation of the entire system stops, and there is a problem in view of maintenance.

SUMMARY OF THE INVENTION

It is therefore an object of the present invention to construct an automatic call distributing system capable of increasing efficiency of the entire system, coping with high traffic, and improving reliability.

It is another object of the present invention to construct an automatic call distributing system that can be easily extended in scale, and that can be used for general purpose.

Other objects of the present invention will become clear as the description proceeds.

According to an aspect of the present invention, there is provided an automatic call distributing method for distributing and controlling incoming calls from a public line network to extension lines in a plurality of extension line groups, respectively by means of an ACDP that houses the plurality of extension line groups, and that is mounted in a PBX, the method comprising the steps of: connecting a plurality of PBXs via a leased communication line to construct a network and to mount the ACDP on two or more PBXs of the plurality of PBXs; and distributing each distribution control in the plurality of extension line groups into the ACDP mounted on the two or more PBXs.

The ACDP may perform distribution and control of an extension group housed in another PBX that differs from a PBX that mounts the ACDP.

The number of terminates that belong to the plurality of extension line groups may be changed according to an amount of traffic.

When one system in the ACDP mounted in the two or more PBXs is down, it may be broadcast that a PBX comprising another ACDP being operated backs up the system down ACDP via the leased line, and a call incoming into a line trunk that the system down ACDP shares may be distributed to the extension line groups by controlling the other ACDP.

According to another aspect of the present invention, there is provided an automatic call distributing system for distributing and controlling incoming calls from a public line network to extension lines in a plurality of extension line groups, respectively by means of an ACDP that houses the plurality of extension line groups, and that is mounted in a PBX, the system comprising: a plurality of PBXs that construct a network via a leased communication line; ACDPs mounted in at least two PBXs in the plurality of PBXs, the ACDPs controlling distribution in the extension line groups; a data base in which at least the ACDP is provided in the PBX and in which information concerning the extension line groups in which the each ACDP controls its distribution; and an incoming sequence queue and a distribution sequence queue provided corresponding to the plurality of extension line groups.

The ACDPs and the data base may be mounted in all PBXs that construct the network.

One or more PBXs in the plurality of PBXs may be connected to the public line network via a line trunk.

The ACDPs mounted on the PBXs may control distribution for extension line groups housed in another PBX.

The terminals that belong to the same extension line group may be housed in a plurality of PBXs.

Each PBX that constructs the network may have means for broadcasting information indicating the network about its presence.

The PBX mounting at least the ACDPs of PBXs that construct the network may have means for detecting system down of PBXs mounting other the ACDPs; means for broadcasting that an ACDP of a PBX with which a system down was detected is backed up via the leased line; and means for distributing to the extension line group an incoming call distributed and controlled by the system down ACDP by controlled its ACDP.

DETAILED DESCRIPTION OF THE PREFERRED EMBODIMENTS

The present invention is characterized in that a network is constructed by a plurality of private branch exchange (PBX) in which an ACDP is mounted, by using a leased communication line, and a plurality of ACDPs are disposed in the network, whereby a load upon a PBX with its high traffic is controlled to be distributed into each extension line group by means of the ACDPs mounted to the plurality of PBXs.

According to the present invention, a load of distribution control is dispersed into a plurality of ACDPs, and thus, a reliable, efficient system can be constructed. Further, even when the number of PBXs is increased, the number of extension line groups or the number of extension lines can be easily increased without affecting telephone services. This makes it possible to construct a dispersed large-scale call distributing system that is more inexpensive and reliable than an intensive large-scale system.

Figure 1:
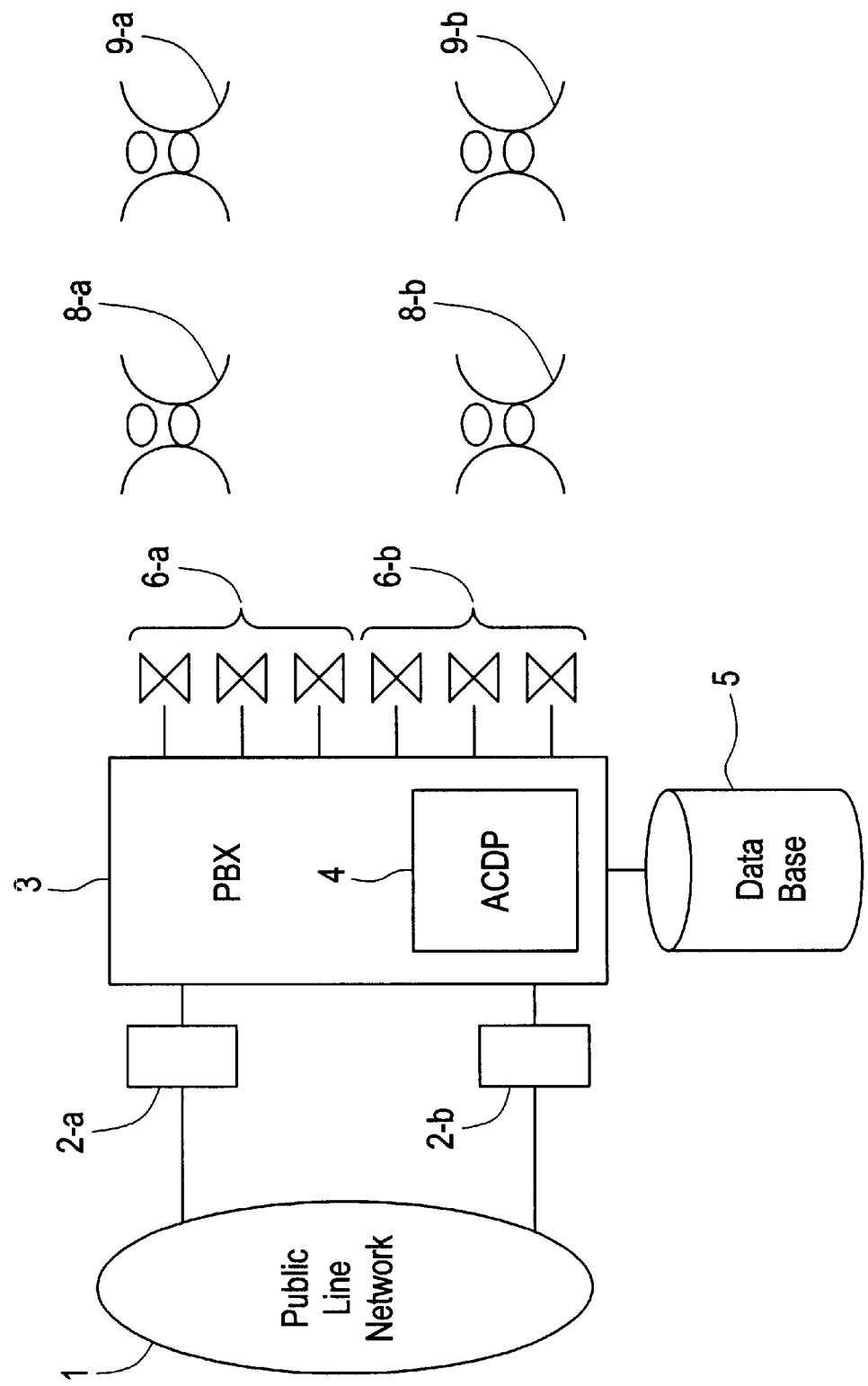
FIG. 1 is a block diagram for schematically showing a conventional automatic call distributing system.
Figure 2:
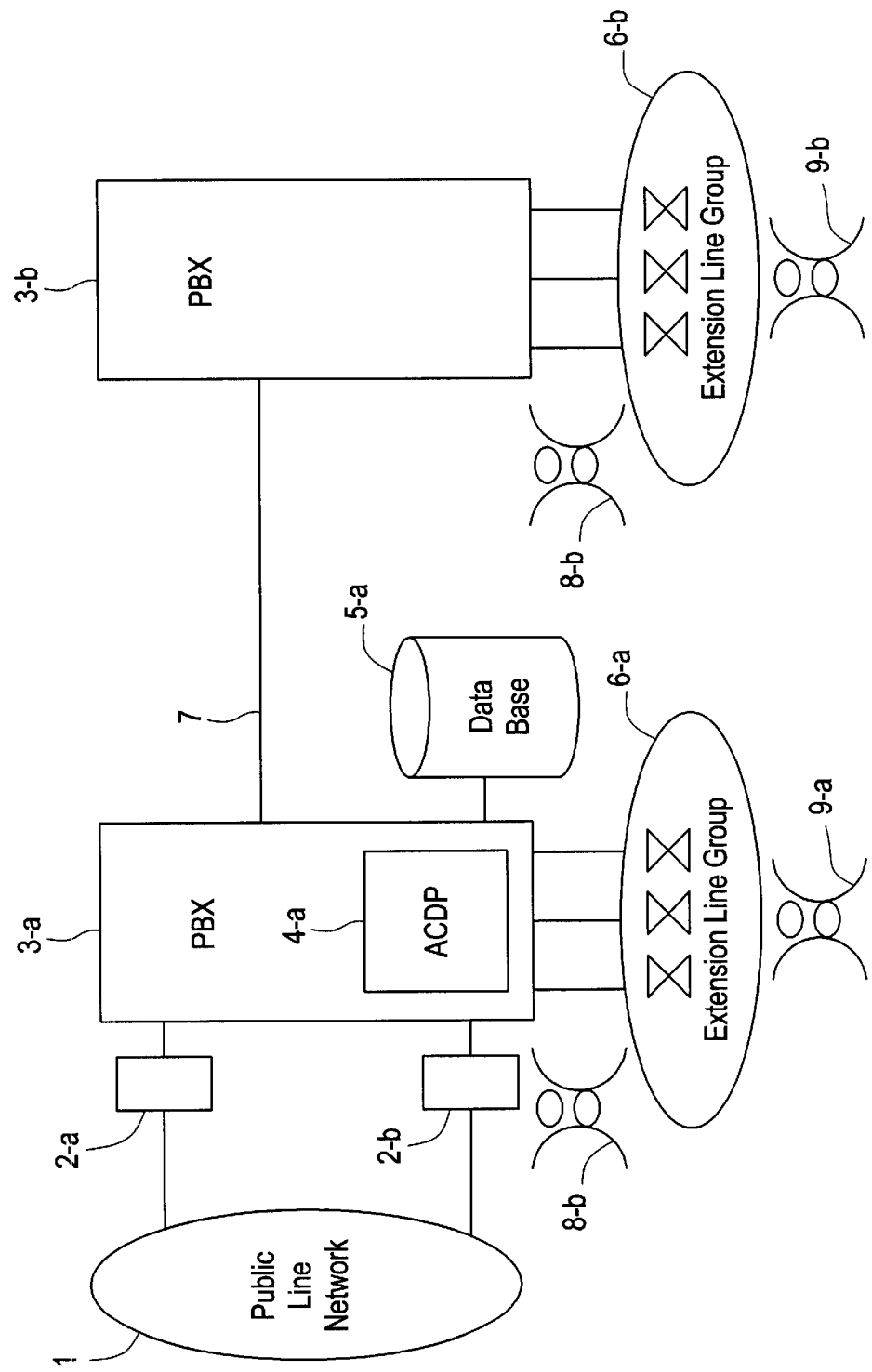
FIG. 2 is a block diagram for schematically showing another conventional automatic call distributing system.
Figure 3:
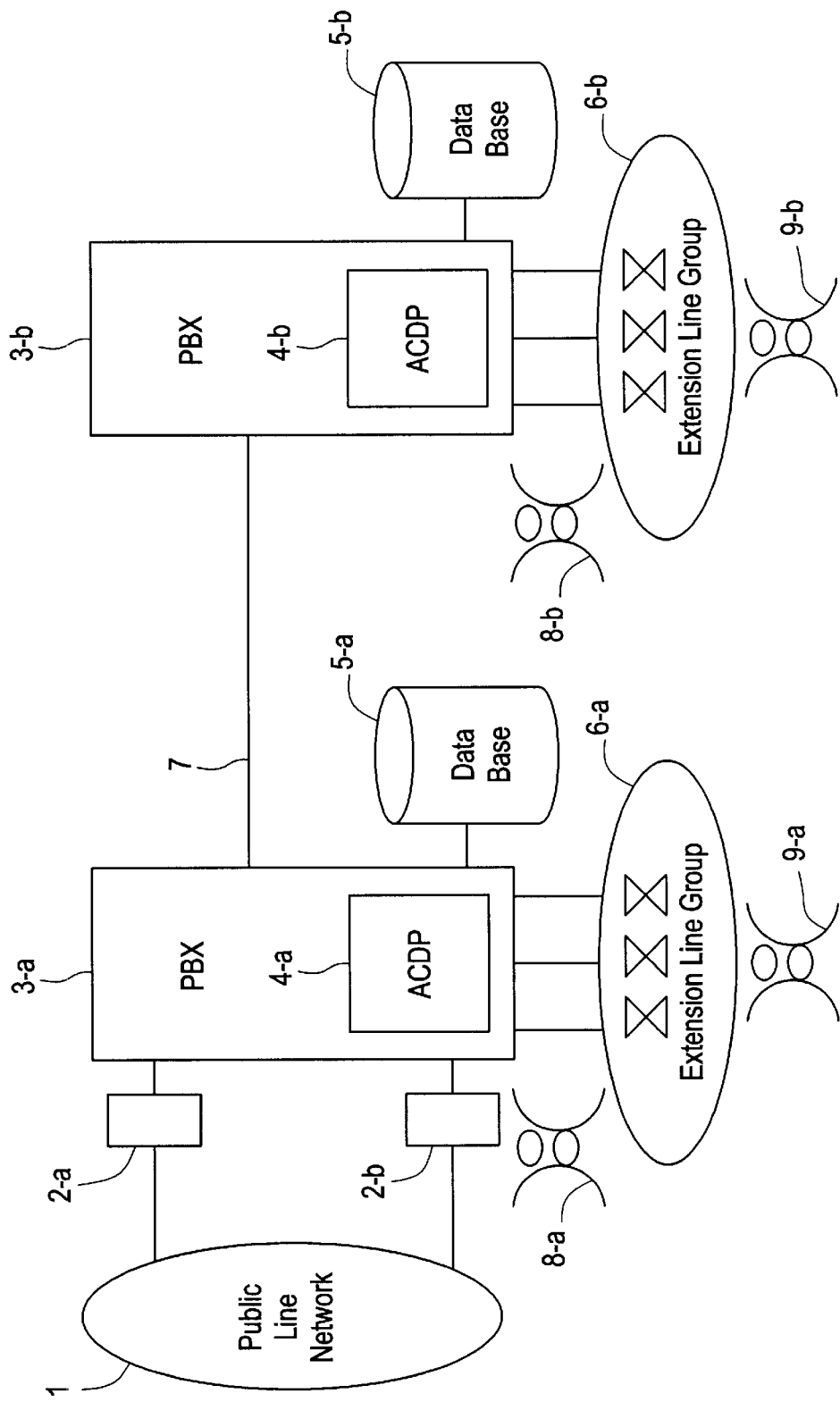
FIG. 3 is a block diagram for schematically showing an automatic call distributing system according to a first embodiment of the present invention.

Now, referring to FIG. 3, description will proceed to an automatic call distributing system according to a first embodiment of the present invention.

FIG. 3 is a block diagram of an automatic call distributing system depicting the first embodiment of the present invention. In the illustrative embodiment, two PBXs (3-*a*) and (3-*b*) are connected to each other via a leased communication line (7) to configure one network. In addition, each PBX mounts ACDPs (4-*a*) and (4-*b*), respectively, and performs exchange control based on the data written in data bases (5-*a*) and (5-*b*), respectively.

The PBX (3-*a*) houses the trunk circuits (2-*a*) and (2-*b*) that control a call from the general public line network (1). In addition, each PBX comprises incoming sequence queues (8-*a*) and (8-*b*) and distribution sequence queues (9-*a*) and (9-*b*).

In each of the data bases (5-*a*) and (5-*b*), the same information concerning the extension line groups controlled by the ACDP mounted in each PBX is written, respectively. The ACDPs (4-*a*) and (4-*b*) of each PBX identify its own controlled and managed extension line groups by referring to their respective data bases (5-*a*) and (5-*b*).

Now, an operation of the illustrative embodiment will be described with reference to FIG. 3.

For the purpose of clarity, it is assumed that an incoming call arrived at the trunk circuit (2-*a*) is distributed to the extension line group (6-*a*); an incoming call arrived at the trunk circuit (2-*b*) is distributed to the extension line group (6-*b*), respectively; the ACDP (4-*a*) controls the extension line group (6-*a*); and management information set for the ACDP (4-*b*) to control the extension line group (6-*b*) is written in each of the data bases (5-*a*) and (5-*b*).

The PBX (3-*a*) detects an incoming call arrived at the line trunk (2-*a*) via the public line network (1), and at the same time, the ACDP (4-*a*) queues an incoming call arrived at the incoming sequence queue (8-*a*). In addition, the ACDP (4-*a*) scans the distribution sequence queue (9-*a*), and controls the incoming call to be distributed to an extension line that seems to be the most preferable in the extension line group (6-*a*).

On the other hand, an incoming call arrived at the line trunk (2-*b*) via the public line network (1) is detected by the PBX (3-*b*) via the leased communication line (7). At the same time, the ACDP (4-*b*) queues an incoming call to the incoming sequence queue of the extension line group (6-*b*). In addition, the ACDP (4-*b*) scans the distribution queue (9-*b*), and control the queued incoming call to be distributed to the optimal extension line belong to the if extension line group (6-*b*).

In the above embodiment, although a description has been given, assuming that extension line groups are fixed with the line trunk and the extension line group corresponding to each other, an incoming call arrived at one line trunk can be distributed to a plurality of extension line groups. In addition, the data bases (5-*a*) and (5-*b*) are rewritten according to the scale of traffic, thereby making it possible to change the number or receiving terminals connected to each extension line group as required. Further, some of the receiving terminals in one extension line group can be used as receiving terminals in another extension line group.

Figure 4:
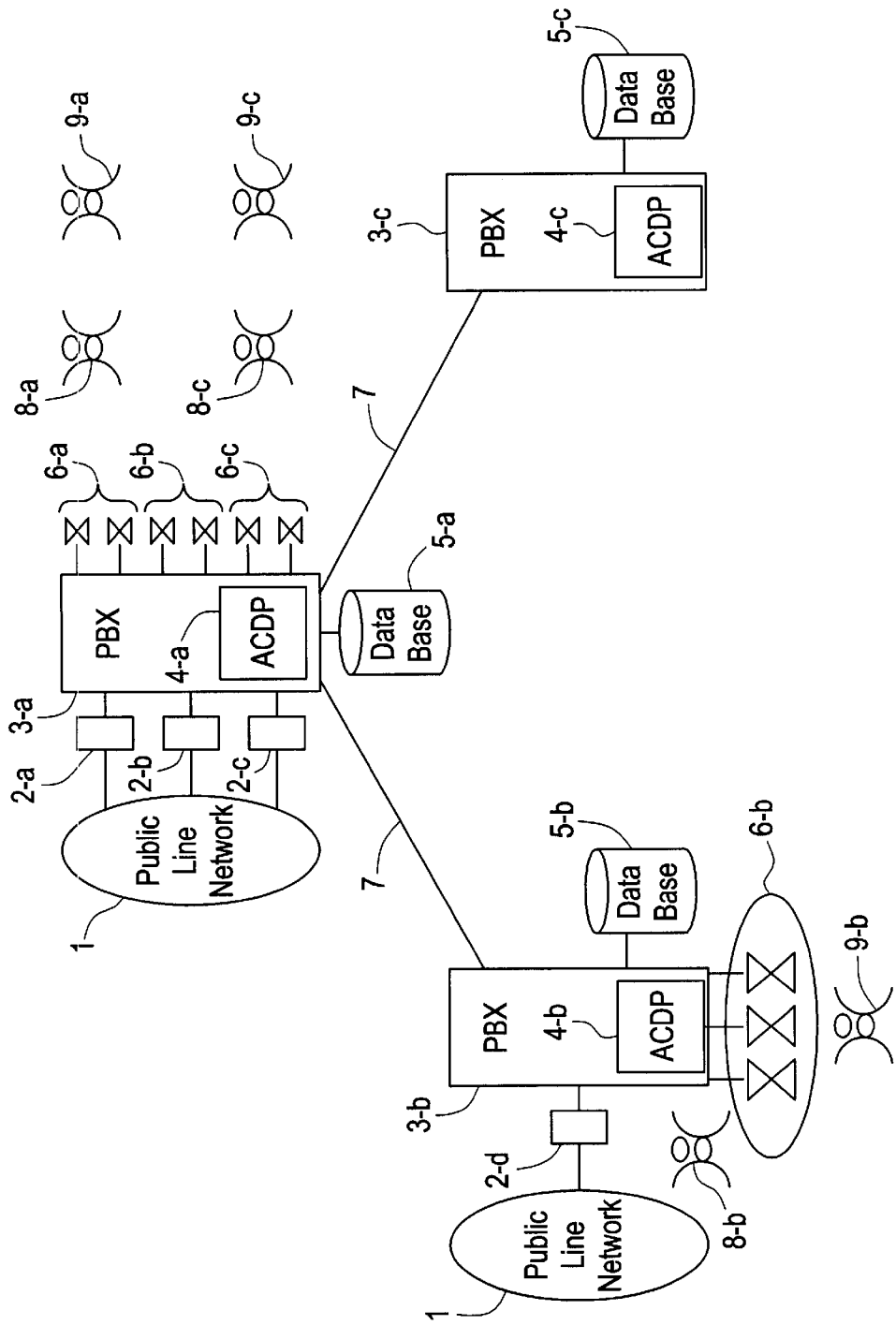
FIG. 4 is a block diagram for schematically showing an automatic call distributing system according to a second embodiment of the present invention.

Next, referring to FIG. 4, description will proceed to an automatic call distributing system according to a second embodiment of the present invention.

FIG. 4 is a block diagram depicting the second embodiment of the present invention. In the first embodiment, for each PBX, the connection control in the extension line group connected thereto is performed by means of the ACDPs (4-a) and (4-b), respectively. However, in the illustrative embodiment, extension lines are controlled across the PBX.

Three PBXs (3-a), (3-b), and (3-c) are connected to each other via the leased communication line (7) to configure one network. In addition each PBX mounts the ACDP (4-a), (4-b), and (4-c), respectively, and exchange control is performed based on data written into the data bases (5-a), (5-b), and (5-c), respectively.

The PBX (3-a) is connected to the public line network (1) via the trunk circuits (2-a), (2-b), and (2-c), and is connected to the extension line groups (6-a), (6-b), and (6-c). This PBX comprises incoming sequence queues (8-a) and distribution sequence queues (9-a) for the extension line group (6-a); and the incoming sequence queue (8-c) and distribution sequence queue (9-c) for the extension line group (6-c).

The PBX (3-b) is connected to the public line network (1) via the trunk circuit (2-d), and is connected to the extension line group (6-b). This PBX comprises the incoming sequence queue (8-b) and distribution sequence queue (9-b) for the extension line group (6-b).

On the other hand, an extension line group is not connected to the PBX (3-c), and the incoming sequence queue and distribution sequence queue are not provided. However, the ACDP (4-c) capable of distributing and controlling the extension line group connected to another PBX is mounted.

Hereinafter, an operation of the illustrative embodiment will be described with reference to FIG. 4.

In this case as well, for the purpose of clarify, it is assumed that, with respect to the management information written in each of the data bases (5-a), (5-b), and (5-c), settings are provided so that an incoming call arrived at the trunk circuit (2-a) is distributed to the extension line group (6-a); incoming calls arrived at the trunk circuits (2-b) and (2-d) are distributed to the extension group (6-b); and the incoming call arrived at the trunk circuit (2-c) is distributed to the extension line group (6-c), respectively, the ACDP (4-a) controls the extension line group (6-a), and the ACDP (4-b) controls the extension line group (6-b), and the ACDP (4-c) controls the extension line group (6-c).

An incoming call arrived at the line trunk (2-a) via the public line network (1) is distributed to the extension line group (6-a) by controlling the ACDP (4-a). The incoming call arrived at the line trunks (2-b) and (2-d) is queued in the same incoming sequence queue (8-b) by means of the ACDP (4-b). At the same time, the ACDP (4-b) scans the distribution sequence queue (9-b), and distributes an optimal extension line to be selected from the extension line group (6-b). In addition, the incoming call arrived at the line trunk (2-c) is transferred to the PBX (3-c) via the leased communication line (7), and is distributed to the optimal extension line of the extension line group (6-c) by means of the ACDP (4-c).

Here, all the data on PBX in the same network is written in the data bases (5-a), (5-b), and (5-c) that respective PBXs maintain. In addition each PBX broadcasts information representing its presence in the network at a predetermined cycle (for example, every 5 minutes). In this manner, the PBX can check the presence with each other.

For example, if an ACDP (4-b) is system down, the information indicating its presence is not broadcast from the PBX (3-b) to another PBX. Thus, it is checked that the ACDP (4-b) is system down. However, the data on the PBX (3-b) maintains the PBX (3-a) and the PBX (3-c). For example, if a priority for backup is assigned to the PBX (3-a), it is broadcast to the network that the ACDP (4-b) backup is performed, and the data bases (5-a) and (5-c) are rewritten accordingly.

As a result, an incoming call arrived at the line trunk (2-b) is distributed to the extension line group (6-a) by controlling the ACDP (4-a), and then, is queued in the incoming sequence queue (8-a). Further, the incoming call arrived at the extension line group (6-b) is processed in batch by the extension line group (6-a).

In this case, terminals in the extension line group (6-b) connected to the PBX (3-b) can be set under the control of the ACDP (4-a).

In each of the aforementioned embodiments, a description has been given assuming that ACDPs are mounted in all of the plurality of PBXs, each of which configures a network via a leased communication line. However, as long as at least two or more ACDPs are mounted in a network, a load can be distributed. Even in the embodiment mounting ACDPs in which some (two or more) of a plurality of PBXs, each of which configures a network, the invention of the present application can be achieved.

According to the invention of the present application, a plurality of PBXs are connected via a leased communication line, and a plurality of ACDP mounted in the PBX operate independently, thereby making it possible to disperse a load. Thus, the efficiency of the entire system is increased, and a system capable of well coping with high traffic can be constructed.

In addition, when the minimal construction of one PBX is extended to a construction of n PBXs, the line capacity, the number of extension line groups, and the number of extension lines or the like can be extended without affecting telephone service. A system according to any customer's request can be constructed, and thus, a general-purpose system can be constructed.

What is claimed is:

1. An automatic call distributing method for distributing and controlling incoming calls from a public line network to extension lines in a plurality of extension line groups, respectively by means of an ACDP that houses said plurality of extension line groups, and that is mounted in a PBX, said method comprising the steps of:

connecting a plurality of PBXs via a leased communication line to construct a network and to mount said ACDP on two or more PBXs of said plurality of PBXs; and distributing each distribution control in said plurality of extension line groups into said ACDP mounted on said two or more PBXs, wherein said ACDP performs distribution and control of an extension group housed in another PBX that differs from a PBX that mounts said ACDP.

2. An automatic call distributing method according to claim 1, wherein the number of terminals that belong to said plurality of extension line groups is changed according to an amount of traffic.

3. An automatic call distributing method according to claim 1, wherein when one system in the ACDP mounted in said two or more PBXs is down, it is broadcast that a PBX comprising another ACDP being operated which backs up said system down ACDP via said leased line, and a call incoming into a line trunk that said system down ACDP shares is distributed to the extension line groups by call control provided by said other ACDP.

4. An automatic call distributing system for distributing and controlling incoming calls from a public line network to extension lines in a plurality of extension line groups, respectively by means of an ACDP that houses said plurality of extension line groups, and that is mounted in a PBX, said system comprising:

a plurality of PBXs that construct a network via a leased communication line;

ACDPs mounted in at least two PBXs in said plurality of PBXs, said ACDPs controlling distribution in said extension line groups;

databases provided in each of said at least two PBXs and in which information concerning said extension line groups in which said each ACDP controls its distribution is stored, each of said databases storing information for all of said extension line groups in said network to thereby provide a backup capability for said network; and an incoming sequence queue and a distribution sequence queue provided corresponding to said plurality of extension line groups.

5. An automatic call distributing system according to claim 4, wherein said ACDPs and said data base are mounted in all PBXs that construct said network, and wherein said data base in each of said PBXs includes the same information concerning said plurality of extension line groups existing in the network.

6. An automatic call distributing system according to claim 4, wherein one or more PBXs in said plurality of PBXs are connected to said public line network via a line trunk.

7. An automatic call distributing system according to claim 4, wherein ACDPs mounted on said PBXs controls distribution for extension line groups housed in another PBX.

8. An automatic call distributing system according to claim 4, wherein terminals that belong to the same extension line group are housed in a plurality of PBXs.

9. An automatic call distributing system according to claim 4, wherein each PBX that constructs said network has means for broadcasting information indicating said network about its presence.

10. An automatic call distributing system according to claim 4, wherein a PBX mounting at least said ACDPs of PBXs that construct said network comprises:

means for detecting system down of PBXs mounting other said ACDPs;

means for broadcasting that an ACDP of a PBX with which a system down was detected is backed up via said leased line; and means for distributing to the extension line group an incoming call distributed and controlled by said system down ACDP by controlled its ACDP.

11. An automatic call distributing system for distributing and controlling incoming calls from a public line network to extension lines in a plurality of extension line groups, respectively by way of a plurality of ACDPs, said system comprising:

a plurality of PBXs that construct a network via a leased communication line, each of said PBXs housing a corresponding one of said ACDPs, to thereby have a one-to-one correspondence between said ACDPs and said PBXs, each of said ACDPs controlling call distribution in at least one of said plurality of extension line groups;

a plurality of databases that are housed on a one-to-one basis in said plurality of PBXs, each of said databases storing information regarding all of said plurality of extension groups, each of said ACDPs utilizing information stored in a corresponding one of said databases to thereby distribute an incoming call to a terminal located in one of said plurality of extension groups assigned to said each of said ACDPs, wherein an incoming call to a terminal connected to at least one of said plurality of extension groups that is directly connected to one of said PBXs is controlled by one of said ACDPs that is housed in another of said PBXs.

* * * * *